United States Patent
Sicilian

(10) Patent No.: US 10,767,647 B2
(45) Date of Patent: Sep. 8, 2020

(54) GRAPHENE ENHANCED ELASTOMERIC STATOR

(71) Applicant: REME TECHNOLOGIES, LLC, Conroe, TX (US)

(72) Inventor: Joshua Alan Sicilian, Houston, TX (US)

(73) Assignee: REME TECHNOLOGIES, LLC, Conroe, TX (US)

( * ) Notice: Subject to any disclaimer, the term of this patent is extended or adjusted under 35 U.S.C. 154(b) by 12 days.

(21) Appl. No.: 16/007,002

(22) Filed: Jun. 13, 2018

(65) Prior Publication Data

US 2018/0355863 A1 Dec. 13, 2018

Related U.S. Application Data

(62) Division of application No. 14/625,365, filed on Feb. 18, 2015, now Pat. No. 10,012,230.

(60) Provisional application No. 61/941,269, filed on Feb. 18, 2014.

(51) Int. Cl.
| | |
|---|---|
| *C08K 5/14* | (2006.01) |
| *F04C 2/107* | (2006.01) |
| *F04C 13/00* | (2006.01) |
| *C08K 9/04* | (2006.01) |
| *C08K 3/04* | (2006.01) |
| *E21B 4/02* | (2006.01) |

(52) U.S. Cl.
CPC ............ *F04C 2/1075* (2013.01); *C08K 3/042* (2017.05); *C08K 5/14* (2013.01); *C08K 9/04* (2013.01); *F04C 13/008* (2013.01); *C08K 3/04* (2013.01); *E21B 4/02* (2013.01); *F05C 2203/0808* (2013.01); *F05C 2225/02* (2013.01); *F05C 2231/00* (2013.01); *F05C 2251/02* (2013.01); *F05C 2251/042* (2013.01); *F05C 2253/04* (2013.01); *Y10T 29/49242* (2015.01)

(58) Field of Classification Search
CPC . C08K 3/042; C08K 5/14; C08K 9/04; C08K 3/04; F04C 2/1075; F04C 13/008
USPC ........................................................ 523/215
See application file for complete search history.

(56) References Cited

U.S. PATENT DOCUMENTS

| | | | |
|---|---|---|---|
| 3,141,050 A | 7/1964 | Blume, Jr. | |
| 3,312,763 A | 4/1967 | Peccerill et al. | |
| 3,368,992 A | 2/1968 | Hans | |
| 3,949,141 A | 4/1976 | Marzocchi et al. | |
| 4,356,280 A | 10/1982 | Wells et al. | |
| 4,425,287 A | 1/1984 | Hesse et al. | |
| 4,443,573 A | 4/1984 | Wells et al. | |
| 4,547,546 A | 10/1985 | Wells et al. | |
| 4,686,252 A | 8/1987 | Burge et al. | |
| 5,363,929 A | 11/1994 | Williams et al. | |
| 5,466,526 A | 11/1995 | Magata | |
| 5,722,820 A | 3/1998 | Wild et al. | |
| 5,759,019 A | 6/1998 | Wood et al. | |
| 6,102,681 A | 8/2000 | Turner | |
| 6,183,226 B1 | 2/2001 | Wood et al. | |
| 6,309,195 B1 | 10/2001 | Bottos et al. | |
| 6,428,890 B1 | 8/2002 | Ting | |
| 6,544,015 B1 | 4/2003 | Kaechele | |
| 6,568,076 B2 | 5/2003 | Bottos et al. | |
| 6,604,922 B1 | 8/2003 | Hache | |
| 6,666,668 B1 | 12/2003 | Kaechele | |
| 6,689,835 B2 | 2/2004 | Amarasekera et al. | |
| 6,726,990 B1 | 4/2004 | Kumar et al. | |
| 6,872,061 B2 | 3/2005 | Lemay et al. | |
| 6,944,935 B2 | 9/2005 | Hache | |
| 7,014,803 B2 | 3/2006 | Perez et al. | |
| 7,074,499 B2 | 7/2006 | Schnurer et al. | |
| 7,083,401 B2 | 8/2006 | Hooper | |
| 7,094,285 B2 | 8/2006 | Mazany et al. | |
| 7,122,594 B2 | 10/2006 | Kubo et al. | |
| 7,316,548 B2 | 1/2008 | Jager | |
| 7,396,220 B2 | 7/2008 | Delpassand | |
| 7,407,372 B2 | 8/2008 | Guidry et al. | |
| 7,442,019 B2 | 10/2008 | Kaiser et al. | |
| 7,517,202 B2 | 4/2009 | Delpassand | |
| 7,691,305 B2 | 4/2010 | Sutton et al. | |

(Continued)

FOREIGN PATENT DOCUMENTS

| | | |
|---|---|---|
| JP | 2008056765 | 3/2008 |
| RU | 2006144784 | 12/2006 |
| WO | 2008107712 | 9/2008 |

OTHER PUBLICATIONS

Office Action for corresponding application No. in 201637027086, dated May 10, 2019, 6 pages.
PCT/US2011/048796 International Search Report and Written Opinion, dated Feb. 11, 2013, 14 pages.
PCT/US2015/16397 International Search Report and Written Opinion, dated Jun. 1, 2015, 22 pages.
C. Ryddy, E Ahearne and G. Byrne, A Review of Magnetorheological Elastomers; Properties and Applications, Advanced Manufacturing Science (AMS) Research Centre, Nov. 14, 2013, 7 Pages, Mechanical Engineering, University College Dublin, Blefield, Dublin 4, Ireland.

*Primary Examiner* — Hannah J Pak
(74) *Attorney, Agent, or Firm* — William E. Sekyi; Patterson Intellectual Property Law, PC

(57) ABSTRACT

An enhanced elastomeric stator assembly and method of making the same is disclosed. The elastomeric stator may be structurally, thermally, and/or chemically enhanced through the incorporation of graphene particles, cross-linkable polymers, coupling agents that extend cross-links, and by the reduction of filler material. The graphene particles can be incorporated in functionalized or non-functionalized form or in a combination thereof, the functionalized graphene increasing the number of cross-links in the overall structure, thereby enhancing the structural robustness of the elastomeric stator. The compound can be formulated to have a relatively low viscosity and other characteristics that allow the material to flow through a mould cavity.

8 Claims, 10 Drawing Sheets

(56) References Cited

U.S. PATENT DOCUMENTS

| | | |
|---|---|---|
| 7,723,421 B2 | 5/2010 | Guzauskas |
| 8,944,789 B2 | 2/2015 | Butuc et al. |
| 9,796,835 B2 * | 10/2017 | Kyker ............ C08L 9/02 |
| 9,988,513 B2 * | 6/2018 | Kyker ............ C08L 9/02 |
| 2002/0064655 A1 | 5/2002 | Morin et al. |
| 2002/0084029 A1 | 7/2002 | Turner et al. |
| 2003/0104231 A1 | 6/2003 | Halladay et al. |
| 2004/0147029 A1 | 7/2004 | Adam |
| 2005/0089429 A1 | 4/2005 | Delpassand et al. |
| 2005/0245664 A1 | 11/2005 | Podszun et al. |
| 2007/0142547 A1 | 6/2007 | Vaidya et al. |
| 2008/0050259 A1 | 2/2008 | Hooper |
| 2008/0145647 A1 | 6/2008 | Ganguli et al. |
| 2008/0304991 A1 | 12/2008 | Speckert |
| 2008/0304992 A1 | 12/2008 | Hooper et al. |
| 2009/0152009 A1 | 6/2009 | Slay et al. |
| 2010/0003530 A1 | 1/2010 | Ganguli et al. |
| 2010/0038142 A1 | 2/2010 | Snyder et al. |
| 2010/0096597 A1 | 4/2010 | Prud'Homme et al. |
| 2010/0098569 A1 | 4/2010 | Robinsson et al. |
| 2011/0156357 A1 | 6/2011 | Noguchi et al. |
| 2011/0245378 A1 | 10/2011 | Russ et al. |
| 2012/0018141 A1 | 1/2012 | John |
| 2012/0148432 A1 | 6/2012 | Butuc et al. |
| 2013/0224452 A1 | 8/2013 | Ramaprabhu et al. |
| 2013/0295367 A1 | 11/2013 | Compton et al. |
| 2013/0333937 A1 | 12/2013 | Avouris et al. |
| 2014/0011969 A1 | 1/2014 | Panchapakesan |
| 2014/0043754 A1 | 2/2014 | Hartmann et al. |

* cited by examiner

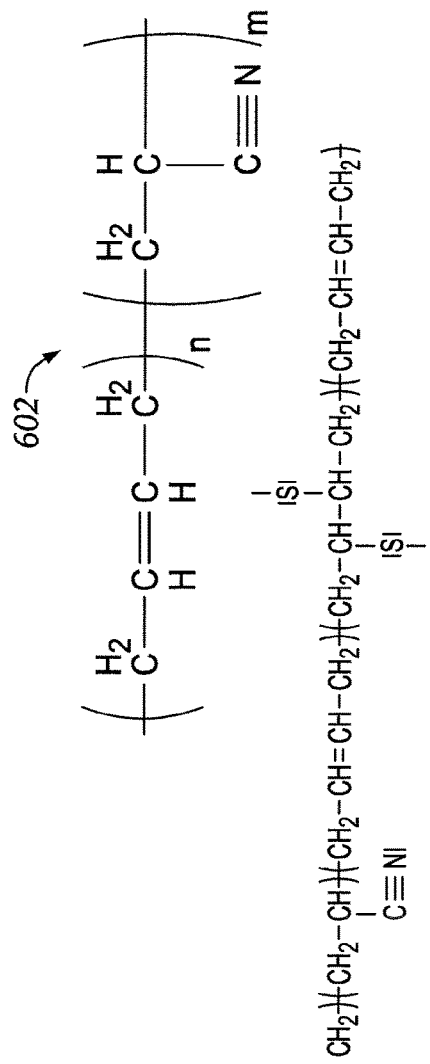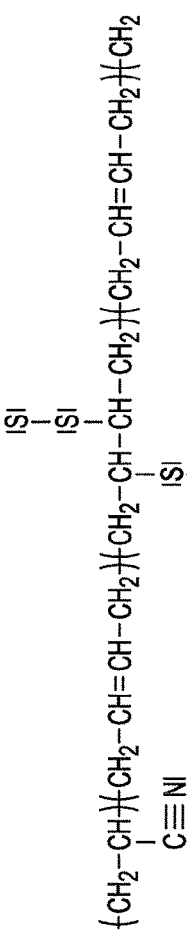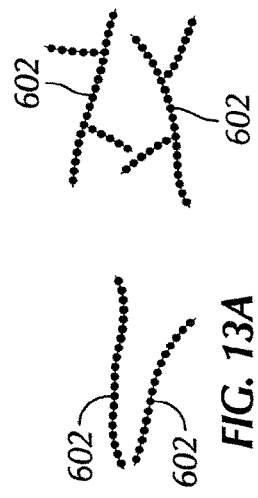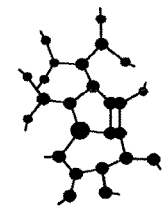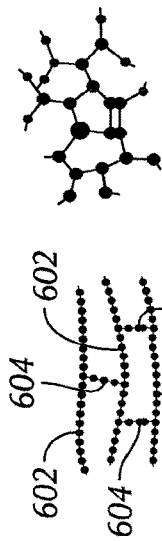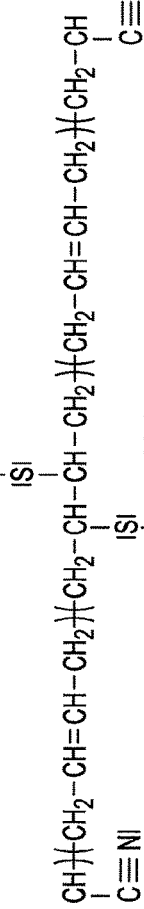
Nitrile butadiene with sulfur cross links
FIG. 13A
FIG. 13B
FIG. 13C
FIG. 13D
FIG. 13

GRAPHENE ENHANCED ELASTOMERIC STATOR

BACKGROUND

1. Field of the Invention

The present invention relates to improved elastomeric stator assemblies.

2. Description of the Related Art

Progressive cavity pumps having elastomeric stator assemblies have been used in drilling operations for some time. In downhole drilling operations, progressive cavity motors pump fluids by spinning a rotor within a stator assembly. In particular, power sections for mud motors have seen extensive use of progressive cavity pumps in the inverse application where drilling fluid is used to turn a rotor within a stator. Often, progressive cavity motors are configured with helical metal lobed rotors that turn within elastomeric stators consisting of rubber with high carbon black filler content. The high carbon black rubber provides a suitable yet cost efficient material having some compressive modulus and abrasion resistance properties. As the metal lobes of the rotors press against the elastomeric stator inner walls, a sealing line is formed and fluid is thus pumped through the cavities as they are formed between the metal lobes of the rotors and the elastomeric stator inner walls.

A challenge to producing a high power, high torque, and high speed power section stator, is that manufacturing equipment and cost effective tooling materials require a low viscosity uncured elastomer compound that is capable of flowing through a tight mould cavity over a long distance while maintaining its uncured state. If a compound is too viscous it cannot flow the appropriate distance to fill the mould. If a compound begins the vulcanization reaction before the mould is filled, the compound will increase in viscosity exponentially, possibly resulting with a mould that is not filled, or a mould that will fill with cross-links that form in separate matrices. Separately formed matrices create undetectable grain boundaries in the elastomer product which will often fail prematurely due to significant losses in tear resistance, losses in modulus, and or friction points internally that facilitate rapid physical deterioration of the surrounding elastomer matrix. Traditionally, designers of power section elastomers have sought to address these issues using reinforcing and semi-reinforcing carbon blacks, low viscosity low molecular weight base NBR and HNBR polymers, and process aids in the recipe. Although such combinations are favorable for manufacturability, the resulting recipe negatively impacts the final cured state properties of the elastomer, often making the formulation softer and less dynamically stable. For example, plasticizer oil may be used to decrease viscosity during manufacturing but, in the finished product, it has a tendency to leach out of the elastomer at high temperatures when exposed to diverse drilling fluids, which can cause shrinkage in the product or de-bonding of the rubber to metal bonding agents, and also facilitate the absorption of chemicals from drilling fluid. Plasticizers are used to reduce the viscosity of an uncured rubber compound by lubricating between the polymer chains and aiding in the dispersion of carbon blacks. Once in cured state, plasticizers continue to lubricate the polymer chains creating an effect of lowered modulus. Additionally, plasticizers, being significantly lower molecular weight than polymers, can migrate out of a compound. Controlling the migration of plasticizers is a function of choosing a plasticizer with the right molecular mass/branching and carbon-to-oxygen ratio for a particular compound. The more branching a plasticizer has, the more resistant the plasticizer is to fluid extraction in oils. The potential to react an ester-based plasticizer into the polymer matrix will substantially increase the resistance to extraction. If plasticizers can be peroxide cross-linked to a polymer, then the same plasticizer can be cross-linked to a functionalized graphene particle, permanently locking the plasticizer into the polymeric matrix. By reacting a plasticizer into the polymers and graphene particles, higher than traditional loadings of plasticizer can be compounded into a recipe without the drawback of having plasticizer leaching out of the compound to the rubber to metal bond of the stator or out of the inner diameter surface. Higher loadings of plasticizer offset the high viscosity effect that nano-particles induce in a compound. Higher loadings of plasticizer also reduce the mixing times of uncured compound by aiding the peptization and dispersion of filler materials like carbon blacks and nanoparticles. By reducing the mixing times and shear rates, less polymer is broken in the mixing process, which will improve physical and dynamic properties such as: modulus, tensile strength, tear resistance, tan delta, shear modulus, compressive modulus and hardness.

Elastomeric compounds have seen the incorporation of phenolic resins as referred to in U.S. Pat. App. Pub. No. US 2008/0050259, which reduces the uncured viscosity of the compound and increases the hardness of the cured state product at the cost of reduced tear resistance.

Elastomeric compounds have also seen some use of nanoparticles; however, due to the extraordinary surface area to particle volume (i.e. aspect ratio), these compounds can greatly increase the viscosity of the elastomer with only small amounts of additive nanoparticles. This means their potential in power sections stator compounds requires such low loadings (to maintain manufacturability) that the cured state physical properties are not attainable at an affordable, reproducible level of satisfaction.

Further, though the helical metal rotors of progressive cavity motors are heat tolerant, abrasion resistant, and have generally long useful lives, the stators of progressive cavity motors are far less reliable and often fail, need servicing, or replacement before their rotor counterparts. The carbon black reinforced liner of stators tends to wear down when exposed to abrasive materials, can develop leaks between cavities. When exposed to harsh temperatures a rubber compound will soften and can result in seal lines being less capable of handling high differential pressure which can result in a loss in torque. High temperatures can also cause the rubber in a liner to thermally expand, which can lead to overheating. Long term exposure to such conditions can cause the rubber to become brittle and lead to low tear resistance. Failures can occur in the form of a section worn down by abrasion leaking and not providing proper sealing pressure against the metal rotor lobes; a physical tear of the inner lining can also occur and cause an immediate shutdown of the entire system. For example, when the stator fails, the rotor can pump torn rubber pieces through cavities and damage other components of the downhole assembly or stop rotating all together. Exposure to certain chemicals or downhole fluids can additionally cause degradation of the stator inner walls. Harsh drilling fluids can be absorbed into the rubber liner, causing swelling which leads to the rubber liner overheating in operation. Fluids can also extract chemicals from the rubber, thereby degrading it.

It would thus be desirable to have a more robust elastomeric stator assembly with increased heat tolerance, abrasion resistance, tear resistance, and other beneficial properties. Further, it would be desirable to provide increased meantime between failures, increased reliability, and an expectation of extended runtime for operations running elastomeric stator assemblies downhole. This would allow greater drilling time and decreased time spent installing, retrieving, and servicing elastomeric stator assemblies and other components of the associated downhole assemblies that can fail as the result of a stator failure. It would further be desirable to increase the predicted time interval between required servicing of elastomeric stator assemblies.

SUMMARY OF THE INVENTION

The present invention involves a graphene enhanced elastomeric stator assembly and method of making the same. The elastomeric stator can be structurally and thermally enhanced through the incorporation of graphene particles, cross-linkable polymers, coupling agents that extend cross-links, and by the reduction of filler material. The graphene particles can be incorporated in functionalized or non-functionalized form or in a combination thereof. The graphene particles can increase polymer to filler interactions in the overall structure of the elastomeric stator, thereby enhancing the structure of the stator and increasing the stator's useful life by providing additional structural and thermal dissipation benefits. The incorporation of graphene particles can also provide a lower coefficient of thermal expansion for the rubber compound, which can reduce damaging heat build-up and extend the useful life of a power section.

Cross-linkable plasticizers can be integrated into graphene enhanced elastomeric stator formulations to additionally enhance the structural rigidity and thermal characteristics of the compound and thus the elastomeric stator. The structural rigidity of the compound is generally increased by having more of the materials in the compound cross-linked. By combining cross-linkable plasticizers and functionalized graphene, such as in the preferred embodiment, the density of cross-links between compounds is further increased over a given area. Further, graphene has conductivity properties not found in materials traditionally used in stators, properties which can transfer, disperse, and dissipate heat through the stator in a quick and efficient manner. Additionally, in an embodiment, the graphene enhanced elastomeric stator compound can be formulated to have a relatively low viscosity, through the use of a cross-linkable plasticizer, and also to have other characteristics that allow the material to flow through a mould cavity over a long distance, similar to how current elastomeric stators are made. In a formulation, a cross-linkable plasticizer can covalently bond to rubber polymer chains, functionalized graphene particles, co-agents, or a combination thereof, which will combat the extraction of the plasticizer in drilling fluids.

BRIEF DESCRIPTION OF THE DRAWINGS

The below drawings and figures serve to illustrate various embodiments of the invention but were not meant to be limiting.

FIG. 8 shows that peroxide/oxygen functionalized graphene particles can be cross-linked into the polymer and/or cross-linked to each other.

FIG. 13 depicts an illustration of a nitrile butadiene having sulfur cross links.

FIGS. 13*a*-13*d* depict a step-by-step illustration of the sulfur vulcanization of polymers.

DETAILED DESCRIPTION

Figure 1:
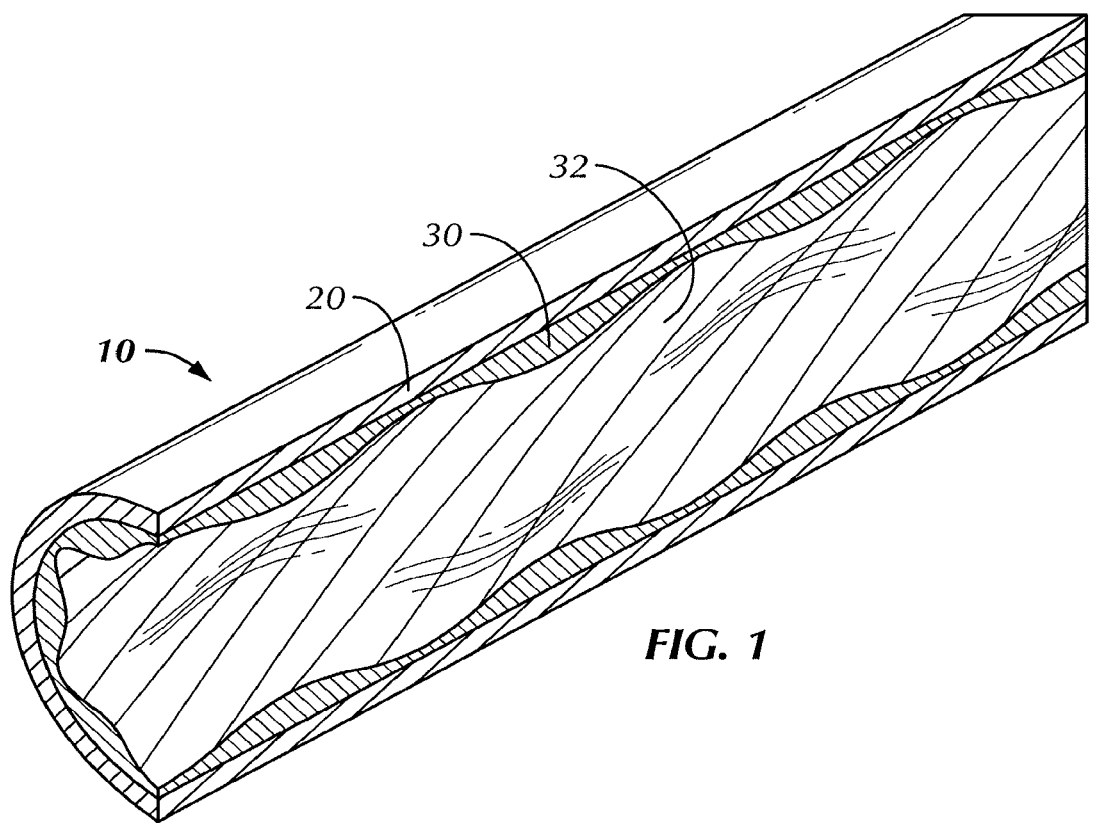
FIG. 1 depicts a perspective cross-sectional view of an elastomeric stator assembly in accordance with an embodiment of the invention.
Figure 2:
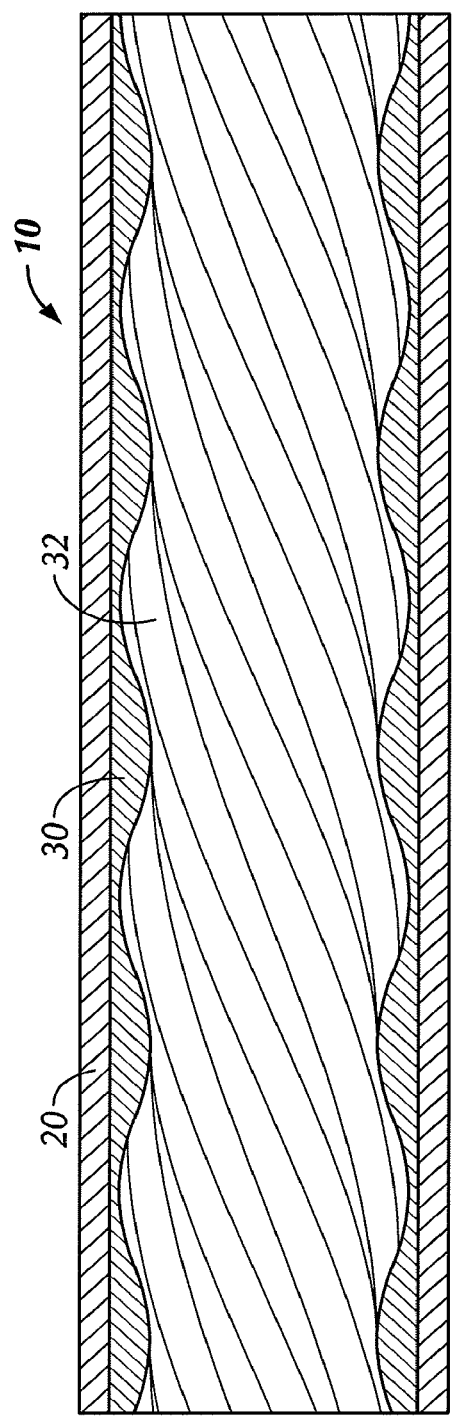
FIG. 2 depicts a side cross-sectional view of an elastomeric stator assembly in accordance with an embodiment of the invention.
Figure 3:
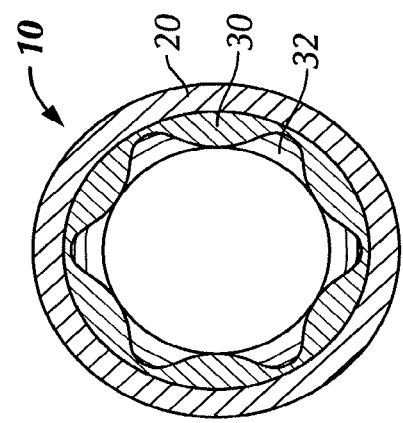
FIG. 3 depicts a top cross-sectional view of an elastomeric stator assembly in accordance with an embodiment of the invention.

Elastomeric stators in progressive cavity motors are often configured with hard metal tubular exterior sleeves and inner elastomeric stator liners that are typically formed by injection molding the liner over a mould mandrel. FIGS. 1-3 depict multiple views of an embodiment of an elastomeric stator assembly 10. Many variations exist regarding the shapes, sizes, and dimensions of elastomeric stators and FIGS. 1-3 merely illustrate an exemplary embodiment of an elastomeric stator assembly as can be configured with any of the various graphene enhanced elastomeric stator compound embodiments described herein or any combination of the multiple embodiments as described herein.

Referring to FIGS. 1-3, in an embodiment, a graphene enhanced elastomeric stator assembly 10 is shown having a metal outer tubular surface 20 and a graphene enhanced elastomeric stator inner liner 30 that connects to the outer tubular surface 20. The elastomeric stator liner inner walls 32 can be formed in a repeating helical pattern of varying length and dimensions and with a variety of different characteristics for various downhole operations.

Figure 4:
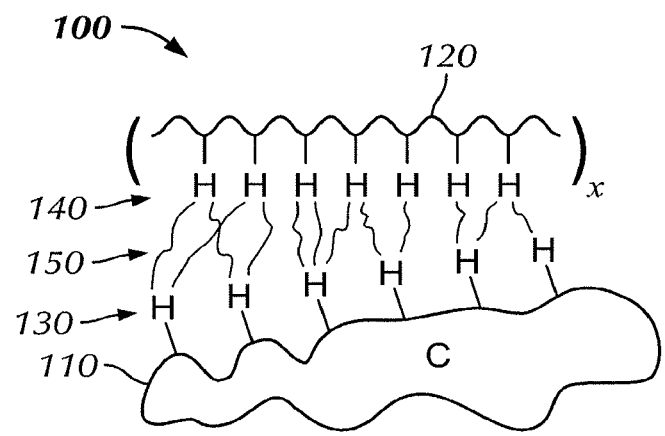
FIG. 4 depicts an illustration of a prior art compound comprising rubber and carbon black filler content.

Referring to FIG. 4, a prior art elastomeric stator compound 100, comprising a majority of carbon black 110 and polymer 120 rubber material is shown. The carbon black hydrogen atoms 130 and the polymer hydrogen atoms 140 are primarily bound by the attractive van der Waals forces 150 present throughout the compound, which is a key component regarding the structural integrity of the overall elastomeric stator compound 100.

Elastomers can be cross-linked through a chemical vulcanization reaction that ties polymers to other polymers through the use of sulfur and/or organic peroxides. Traditionally, sulfur is used in an application where modulus and high temperature resistance are lower priorities. On the other hand, organic peroxides have the advantage of being shorter and having more electronegative covalent bonds. These "harder" peroxide induced carbon-to-carbon cross-links have a few disadvantages as well: the resulting rubber compounds can be more brittle with lower tear resistance despite exceptional modulus; the vulcanization reaction can be higher energy and difficult to slow down; and cross-linking of elastomer polymers to bonding agent polymer coatings (adhesives) is more challenging to consistently reproduce.

The addition of nano-particles, including carbon nanotubes, graphene particles, nano-clays, bucky balls and other three dimensional engineered carbon structures (reinforcing fillers), that offer large surface-area to weight ratios can be beneficial to reinforcing elastomeric polymers by utilizing the high surface area particles to create an increase in van der Waals attractive forces between the polymer and filler particles. Platelet shaped particles can also influence the chemical resistance of an elastomer, by creating inert barriers that stop the progress of permeating drilling fluid chemicals.

Power sections for mud motors are continually pushed for performance and downhole drilling reliability. One advantage of graphene enhanced elastomeric stator compounds, is that higher modulus materials are capable of sustaining more differential pressure across an elastomer lobe sealed by a metal rotor lobe. The cavity between a rotor and stator can only maintain differential pressure and imparted torque efficiently if the stator elastomer is of high enough modulus to not deflect, thus preventing fluid from progressing forward to the subsequent cavity. Fluid slippage between the rotor and stator interface can cause a loss in the volumetric fluid pressure to torque efficiency. A further benefit of the higher modulus material, is that the more differential pressure the elastomer lobe can sustain, the more torque will be imparted to the metal rotor. In power sections, the flow through is proportional to the eccentric rotating speed of the rotor for any given standard geometry and power section stators can function as a dynamic sealed interface with which the rotor interacts. Not only must an elastomer compound maintain modulus to make the seal, but the visco-elastic dynamic properties must maintain a mostly elastic response over high frequencies in high temperature drilling environments. The ability for a lobe to "snap" back is a function of the elastic dynamic decay of the modulus around the frequency of the power section's maximum rated flowrate and differential. The less decay in the elastic response the more differential pressure a power section stator can handle at higher flowrates and the more powerful and reliable the power section is likely to be in challenging drilling environments.

Graphene particles and other nano scale sheets of carbon are not bound together or to one another by the strong interfacial van der Waals forces that are common among graphitic materials. Other nano scale sheets can be substitutes for graphene for certain formulations. Further, and as referenced previously, graphene particles can be chemically altered, with a reactive functional group covalently bonded to the particles. Functional groups may include phenolic ring structures, sulfur atoms or sulfur chains, organic peroxide groups, formaldehyde functional groups, isocyanates, isocyanurates, tetramethylmethylamine (TMTM), hexamethylmethylamine ("hexa," HMT), and/or fatty acid groups/hydroxl groups.

Table 1 below lists embodiments of graphene enhanced elastomeric stator compounds having functionalized or non-functionalized graphene particles that are dispersed in a polymer matrix of NBR, HNBR, XNBR, XHNBR, or FKM (fluoro/perfluoro elastomer) for use in power section drilling stators that require exceptional cured state tensile modulus, tear resistance, shear modulus, compressive modulus, elastic dynamic stability, high temperature resistance to polymer chain scission, surface abrasion resistance to the drilling fluid solids and/or rotor metal finish and fluid swelling resistance (when exposed to various water based, oil based, or synthetic oil based drilling fluids, as well as other similar fluids).

Table 1—Example Embodiments of Graphene Enhanced Elastomeric Stator Compounds

- Non-functionalized graphene particles may be a single mono-carbon layer sheet thickness.
- Non-functionalized graphene particles may be from 2-30 carbon sheets thick.
- Functionalized graphene particles may be a single mono-carbon layer sheet thickness.
- Functionalized graphene particles may be from 2-30 carbon sheets thick with 1 or more sheets having a functional group covalently bonded to one or more carbon atoms. Multi-layer graphene particles may only have functionalization of the outer most layers, not necessarily a functional group of all the layers.
- Functional groups may be single bond sp3 hybridization or an sp2 hybridization with strained carbon bonds, therefore slightly warping the carbon graphene sheet with a "kink." Non-functional groups can also have a "kink."
- Graphene particles may be dispersed homogenously and/or amorphously into a NBR with a Mooney viscosity at 100° C. of 20-75 Mooney units.
- Graphene particles may be dispersed homogenously and/or amorphously in an NBR with an acrylonitrile content ranging from 25-65%.
- Graphene particles may be dispersed homogenously and/or amorphously in an HNBR with a Mooney viscosity at 100° C. of 20-75 Mooney units.
- Graphene particles may be dispersed homogenously and/or amorphously in an HNBR with an acrylonitrile content ranging from 25-65%.
- Graphene particles may be dispersed homogenously and/or amorphously in an XNBR with a Mooney viscosity at 100° C. of 20-75 Mooney units.

Graphene particles may be dispersed homogenously and/or amorphously in an XNBR with an acrylonitrile content ranging from 25-65%.

Graphene particles may be dispersed homogenously and/or amorphously in an XHNBR with a Mooney viscosity at 100° C. of 20-75 Mooney units.

Graphene particles may be dispersed homogenously and/or amorphously in an XHNBR with an acrylonitrile content ranging from 25-65%.

Graphene particles may be dispersed homogenously and/or amorphously in an fluoroelastomer base polymer with a Mooney viscosity at 100° C. of 20-150 Mooney units.

Graphene particles may be dispersed homogenously and/or amorphously in an XHNBR with fluoro or perfluoro branching of the polymer at a content ranging from 15-80%.

Table 2 below lists example embodiments non-functional and functional group that include a reactive group or groups common to rubber chemistry and require little or no special processing to react into the filler-polymer-crosslink network in an embodiment of a graphene enhanced elastomeric stator compound.

Table 2—Example Embodiments of Groups Reacted into Graphene Enhanced Elastomeric Stator Compound Graphene particles that do not contain functional groups but that have dispersion which may be improved through ionic, organic salt or covalent compound additives that "wet-out" the carbon surface chemistry without substantially impacting polymer-to-polymer shear forces that are necessary to physically masticate carbon filler materials into the polymer matrix in the mixing process. (e.g. high molecular (more than 8 carbon atoms) fatty acids).

Graphene functional groups may be phenolic ring structures, sulfur atoms or sulfur chains, organic peroxide groups, formaldehyde functional groups, isocyanates, isocyanurates, tetramethylmethylamine (TMTM), hexamethylmethylamine ("hexa," HMT), hexamethylene methylamine ("hexa," HMM) and/or fatty acid groups A compound with peroxide/oxygen functionalized graphene particles cross-linked directly with one or more of the above variety of polymers.

A compound with peroxide/oxygen functionalized graphene particles indirectly cross-linked with one or more of the above variety of polymers and/or other graphene particles through the use of coagents to bridge the peroxide induced cross-links. Coagents may include maleinized polybutadiene, metal methacrylate organic salts, trifunctional acrylic esters, non-nitroso functionalized co-agent monomers, 1,3 butylene glycol dimethacrylate, trimethylolpropane triacrylate, ethoxylated trimethylolpropane triacrylate.

A compound with peroxide/oxygen functionalized graphene particles directly and indirectly cross-linked with the above variety of polymer and/or other graphene particles through the use of a cross-linkable reactive ester plasticizer to reduce uncured viscosity of the compound, minimize leaching at elevated temperatures and diverse fluid conditions while increasing dynamic performance by chemically locking graphene particles to the polymeric matrix through vulcanization reactions.

A compound that uses a peroxide compatible co-agent to cross link peroxide/oxygen functionalized graphene particles to polymers and reactive esters as cross-linkable plasticizers.

A compound that uses triallyl cyanurates, triallyl isocyanurate, and/or polyol monomers as co-agents to chemically cross-link isocyanurate, urethane, and/or cyanurate functionalized graphene particles to themselves and to sulfur and/or peroxide cured base elastomer polymer chains.

A compound that uses isocyanurate, urethane, and/or cyanurate functionalized graphene particles cross-linked to millable urethane additives in an elastomer recipe with a base polymer from the above list.

A compound that uses phenolic, peroxide, oxygen functionalized graphene particles, or a combination thereof, cross-linked to phenolic resins by using ethoxylated bisphenol A diacrylate as a co-agent in an elastomer recipe with a base polymer from the above list.

A compound that uses phenolic functionalized graphene particles cross-linked to the base polymer by using ethoxylated bisphenol A diacrylate with a formaldehyde reaction with hexamethylenetetramine or hexamethylene methylamine as a methylene donating activator to the vulcanization reaction.

A graphene enhanced elastomeric stator can begin with the dispersion of graphene particles or sheets into an uncured rubber compound. In an embodiment, before dispersion the graphene is configured with graphene particles or sheets of optimal size for a given formulation. The sizing of the graphene particles can be optimized while keeping in mind the later steps of the process that can further break apart or break down some of the graphene particles. Alternatively, optimizing the tear resistance of a group of compounds with the same graphene concentration and variable graphene particle size can be more cost effective. Chemically etching fracture surfaces of graphene enhanced elastomers can be viewed under an electron microscope to determine particle sizes, particle density, and the level of optimization achieved. Further, in an embodiment, the graphene can be functionalized before dispersion to increase the cross-link density of what will become the graphene enhanced elastomeric stator.

In an embodiment, semi-reinforcing and highly reinforcing carbon black can be used to aid in the graphene and polymer dispersion of graphene into the polymer matrix.

Figure 5:
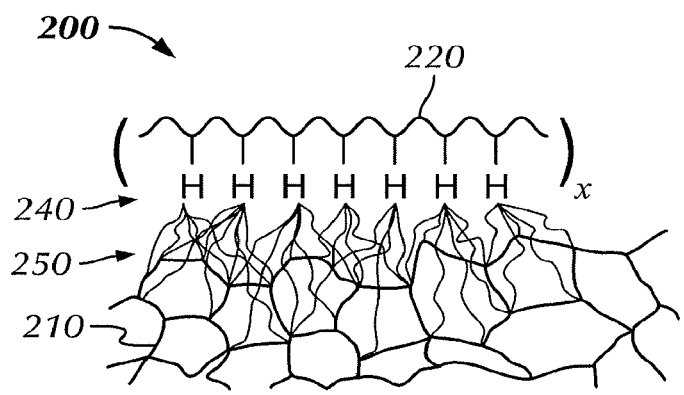
FIG. 5 depicts an illustration of the van der Waals bonding forces between a rubber and a non-functionalized graphene particle in accordance with an embodiment of the invention.

Referring to FIG. 5, a bonded graphene particle 210 and polymer 200 are shown. Similar to the FIG. 4 prior art discussed above, the graphene particle 210 is mainly bonded to the polymer 200 hydrogen atoms 240 by van der Waals forces 250. The tendency for graphene particles to maintain their shape in a geometric plane can allow for even stronger van der Walls forces to be present, thereby creating additional structural rigidity in an elastomeric stator merely by adding graphene particles and not overly damaging the particles in the manufacturing process.

Figure 6:
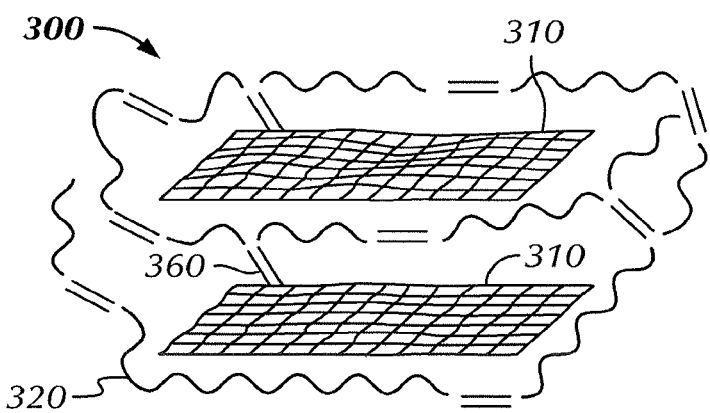
FIG. 6 depicts an illustration of a graphene enhanced elastomeric stator compound having peroxide/oxygen functionalized graphene in rubber in accordance with an embodiment of the invention.
Figure 7A:
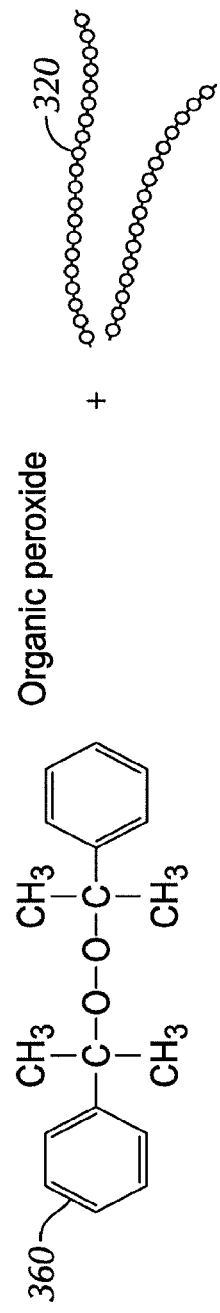
FIGS. 7*a*-7*c* depict a step-by-step illustration of how peroxide cross-links are formed in a graphene enhanced stator compound.
Figure 7B:
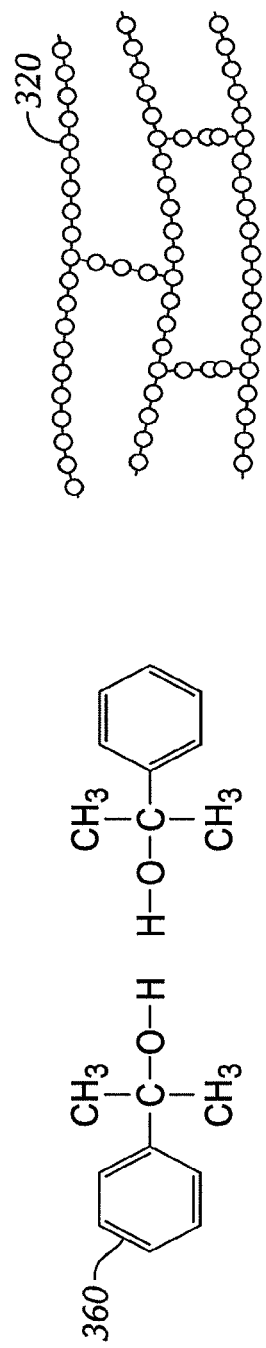
Figure 7C:
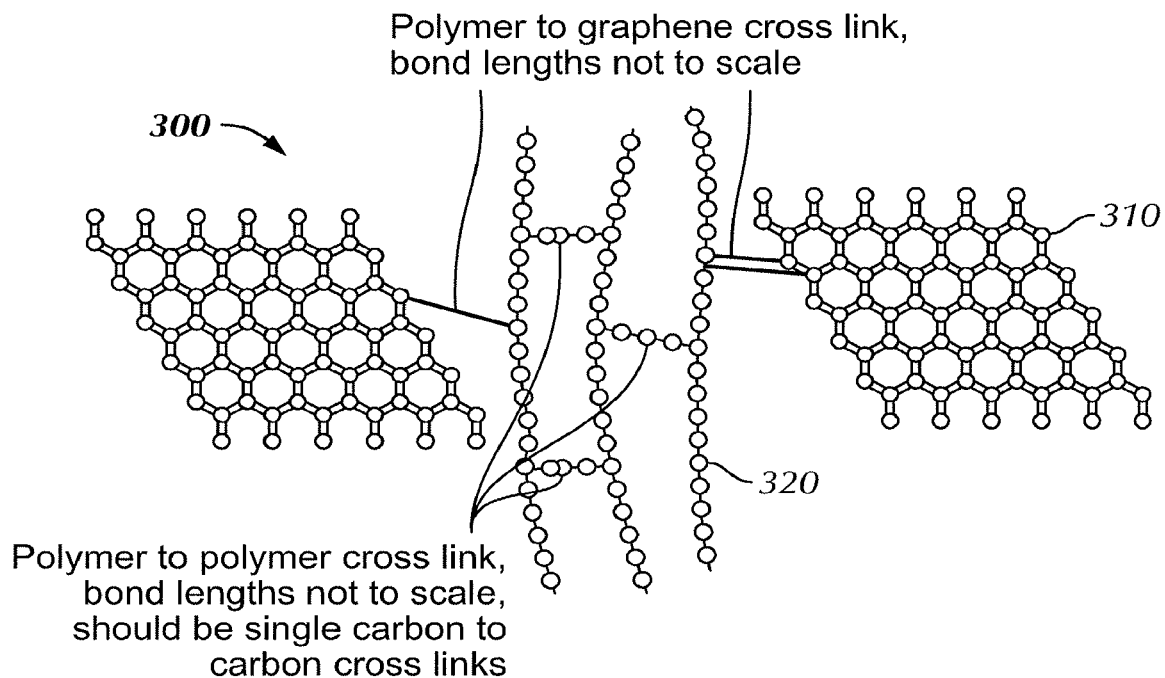
Figure 8:
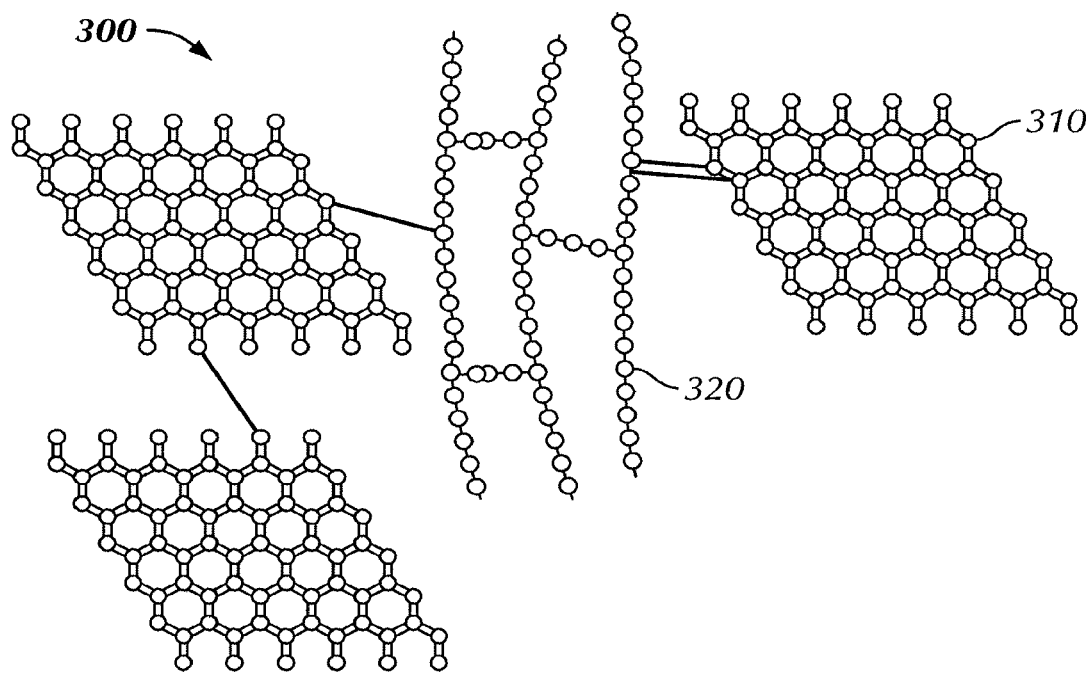
FIG. 8 depicts an alternate illustration of a graphene enhanced elastomeric stator compound having peroxide/oxygen functionalized graphene in rubber in accordance with an embodiment of the invention.

FIG. 6 illustrates an embodiment of a graphene enhanced elastomeric stator compound 300. In this embodiment, graphene particles 310 are functionalized by peroxide/oxygen atoms 360 and cross-linked with polymer 320. The cross-link density of such a particle is increased over the standard elastomeric stator compounds, thereby providing structural rigidity and thermal dissipation properties for an elastomeric stator composed of the compound. FIGS. 7a-7c illustrates how peroxide cross-links are formed, FIG. 7c showing an embodiment of the enhanced elastomeric stator compound. Referring to FIG. 8, an alternate illustration of a peroxide/oxygen functionalized graphene compound is shown, illustrating how peroxide cross-links can form between graphene particles and between graphene particles and polymer. Compounds resulting from this embodiment may have improved modulus and/or hysteretic dynamic response over a broader range of strain frequencies and operating temperatures than traditional stator elastomers. Compounds with a high degree of cross-linking resulting from this embodiment may have a lower coefficient of thermal expansion, which will potentially allow a stator to maintain an optimized rotor-to-stator fit throughout a broader range of operating temperatures (whereas 50 degrees F. is the normal fit interval in a traditional stator elastomer).

Figure 9:
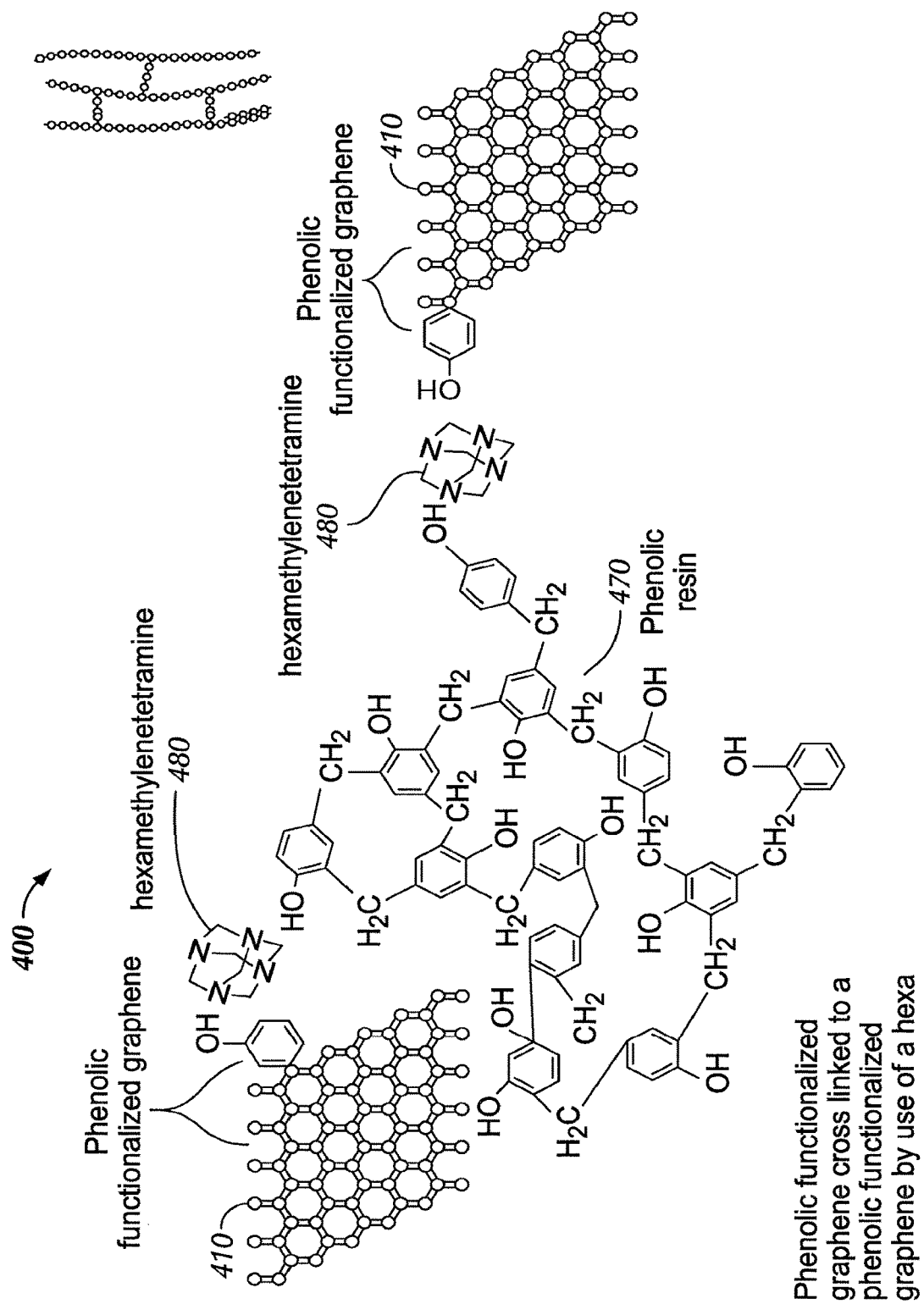
FIG. 9 depicts an illustration of a graphene enhanced elastomeric stator compound having phenolic functionalized graphene with hexamethylmethylamine ("hexa" or "HMT") in accordance with an embodiment of the invention.
Figure 10:
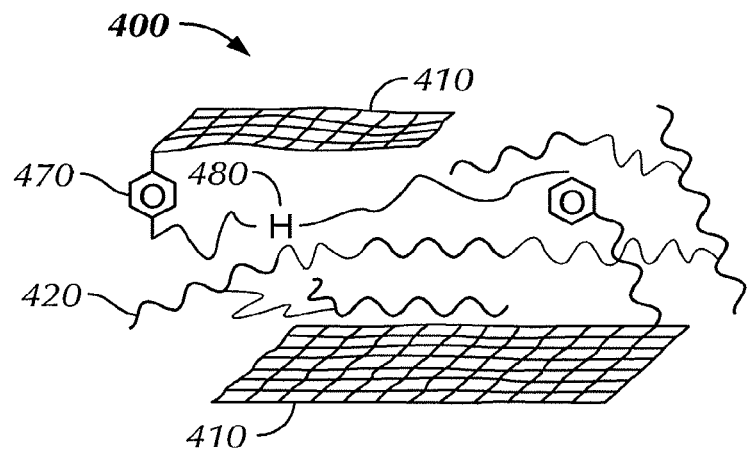
FIG. 10 depicts an illustration of a graphene enhanced elastomeric stator compound having phenolic functionalized graphene with hexa in rubber in accordance with an embodiment of the invention.
Figure 11:
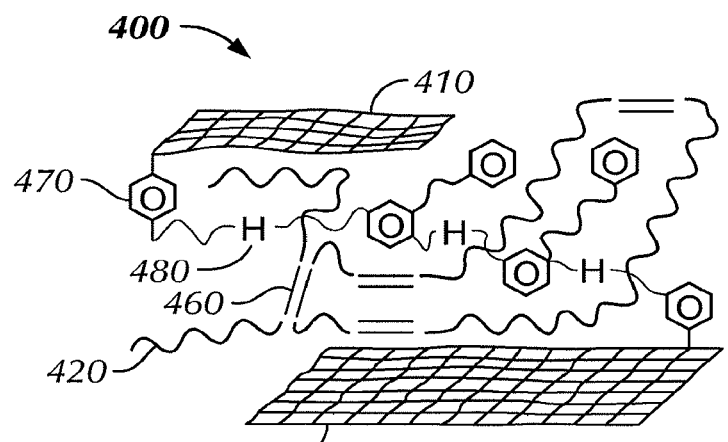
FIG. 11 depicts an illustration of a graphene enhanced elastomeric stator compound having phenolic functionalized graphene with hexa and peroxide in rubber in accordance with an embodiment of the invention.

Referring to FIG. 9, in an embodiment, a graphene enhanced elastomeric stator compound 400 is shown, having phenolic functionalized graphene particles 410. The phenols 470 can bond to the graphene particles and cross-link with hexamethylmethylamine or alternatively hexamethyltetramine ("hexa" or "HMT") 480. FIG. 10 shows an embodiment of the elastomeric stator compound described in FIG. 9 mixed with rubber polymer molecules 420. FIG. 11 illustrates an alternate embodiment of the elastomeric stator compounds shown in FIGS. 9-10, by adding peroxide induced cross links 460, thereby further increasing the cross-link density of the overall compound. Utilizing phenolic resins typically increases the cured state hardness and low strain modulus of a compound, while decreasing the viscosity in uncured state (lots of industry examples exist). Combining thermosetting phenolic resins with graphene reinforced elastomer may lower the uncured viscosity of the compound into a range that leads to easier manufacturing without compromising the cured state properties as do traditional plasticizers.

Figure 12:
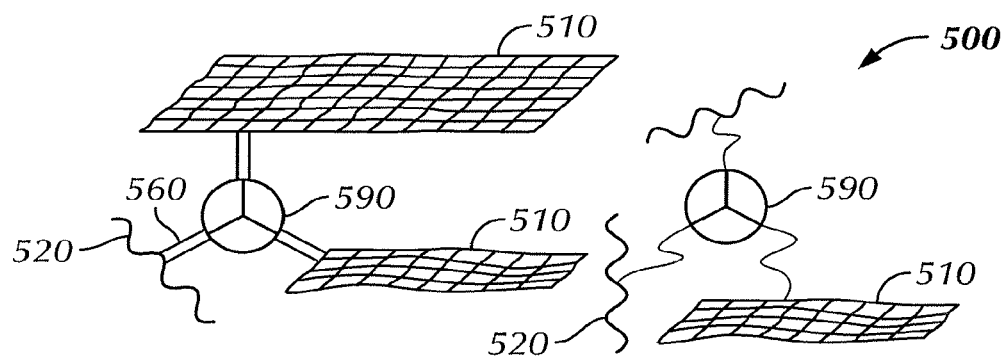
FIG. 12 depicts an illustration of a graphene enhanced elastomeric stator compound having peroxide/oxygen functionalized graphene in rubber with trifunctionalized methacrylates in accordance with an embodiment of the invention.
Figure 14:
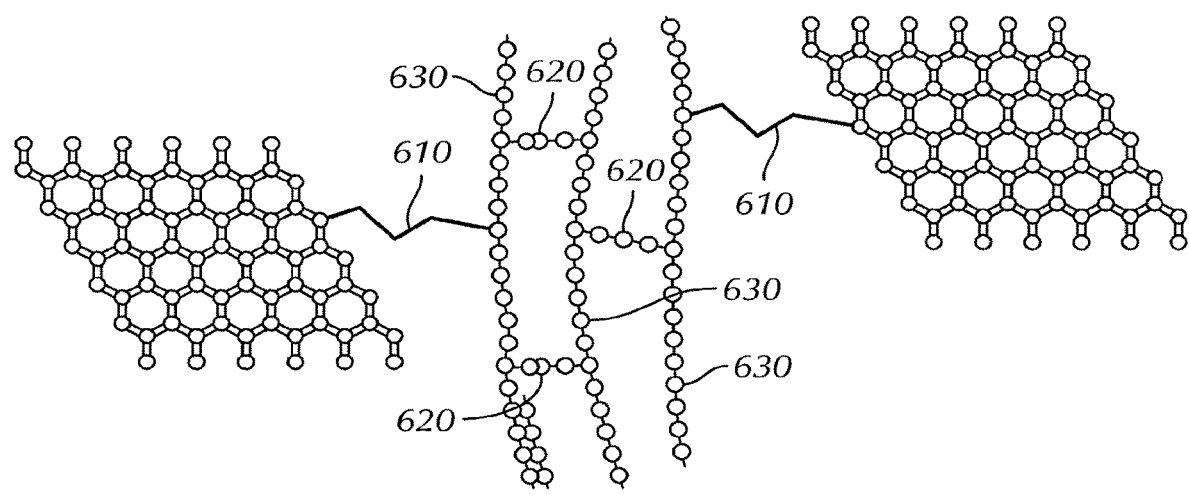
FIG. 14 depicts an illustration of a graphene enhanced elastomeric stator compound having polymer to sulfur functionalized graphene cross links.
Figure 15:
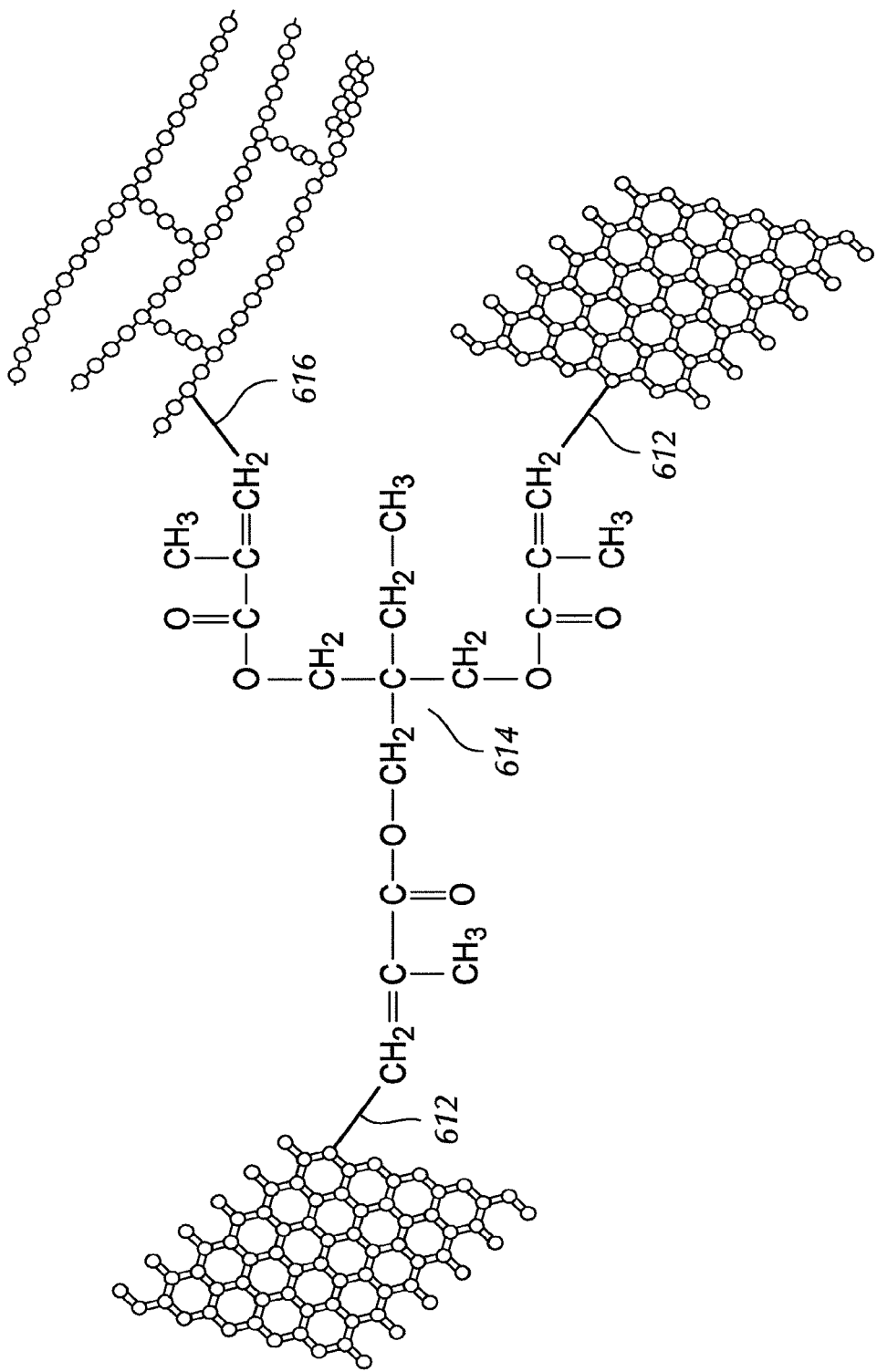
FIG. 15 depicts an illustration of peroxide/oxygen functionalized graphene cross linked to a trifunctional co-agent by means of an organic peroxide.

Referring to FIG. 12, in an embodiment, a graphene enhanced elastomeric stator compound 500 is shown, having elastomeric stator particles 510, polymer molecules 520, peroxide induced cross links 560, trifunctionalized methacrylates 560. Trifunctional methacrylates act as a three-way bridge between the polymer and the functionalized graphene particles. In this way, the peroxides efficiency is increased, allowing polymer-to-polymer-to-graphene cross-link sub-structures and/or graphene-to-graphene-to-polymer cross-link sub-structures. In this embodiment, sulfur can delay the peroxide curing reaction at relatively low cure temperatures, which will aid in the processing of stators by keeping the compound in an uncured state until the stator mould is completely filled. Sulfur can also supplement the polymer-to-polymer cross-link density if the peroxide reactions have a higher affinity to react with the graphene particles. The overall result is an increase in modulus with potentially higher tear resistance, as the compound's sub-structures will break up natural tearing boundaries between the polymers and polymer-to-graphene boundaries. FIG. 13 shows an example of nitrile butadiene 602 having sulfur cross links 604. FIG. 13(a)-(d) shows a step by step process of sulfur vulcanization of polymers. FIG. 13(d) shows the larger scale end result of sulfur vulcanization of this example. FIG. 14 shows an example embodiment of graphene enhanced elastomeric stator compound having polymer to sulfur functionalized graphene cross links 610. Polymer to polymer cross links 620 are shown vulcanizing the polymer NBR 630 or alternatively HNBR (not shown). Referring to FIG. 15, an embodiment of peroxide/oxygen functionalized graphene cross linking to a trifunctional co-agent by means of an organic peroxide is shown 612. Trimethylolpropane trimeethacrylate 614 or similar tri-functionalized co-agents can be utilized to increase the cross-link density of the compound. An ethylene group of co-agent cross-linked to polymer through peroxide vulcanization is shown 616 though other trifunctional co-agents may be used.

Due in part to increased heat resistance, faster thermal dissipation, and enhanced structural rigidity, a graphene enhanced elastomeric stator allows for longer runtime between failures downhole than prior designs. More specifically and in addition, a graphene enhanced stator can have exceptional cured state tensile modules, tear resistance, shear modulus, compressive modulus, elastic dynamic stability, high temperature resistivity to polymer chain scission, surface abrasion resistance to drilling fluid solids and rotor metal finish and fluid swelling resistance. Each of these properties can provide synergies that allow for far greater downhole performance and longevity when compared to prior designs in the industry.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

The invention claimed is:

1. A method of forming a graphene enhanced elastomeric stator, wherein the method includes the following steps:
    forming a metal stator outer tubular having an inner tubular surface, and
    forming a graphene enhanced elastomeric stator inner liner on said inner tubular surface comprising adding a co-agent to an elastomeric material mixture, the mixture including elastomeric material and graphene particles, to bridge peroxide induced cross-links.

2. The method of forming a graphene enhanced elastomeric stator of claim 1 wherein the co-agent comprises maleinized polybutadiene.

3. The method of forming a graphene enhanced elastomeric stator of claim 1 wherein the co-agent comprises metal methacrylate organic salts.

4. The method of forming a graphene enhanced elastomeric stator of claim 1 wherein the co-agent comprises trifunctional acrylic esters.

5. The method of forming a graphene enhanced elastomeric stator of claim 1 wherein the co-agent comprises non-nitroso functionalized co-agent monomers.

6. The method of forming a graphene enhanced elastomeric stator of claim 1 wherein the co-agent comprises butylene glycol dimethacrylate.

7. The method of forming a graphene enhanced elastomeric stator of claim 1 wherein the co-agent comprises trimethylopropane triacrylate.

8. The method of forming a graphene enhanced elastomeric stator of claim 1 wherein the co-agent comprises ethoxylated trimethylolpropane triacrylate.

* * * * *